US010421336B2

(12) United States Patent
Vincent (10) Patent No.: US 10,421,336 B2
(45) Date of Patent: Sep. 24, 2019

(54) SUCTION PULSER INTENDED FOR A HEATING, VENTILATION AND/OR AIR-CONDITIONING DEVICE OF A MOTOR VEHICLE

(71) Applicant: Valeo Systemes Thermiques, Le Mesnil Saint Denis (FR)

(72) Inventor: Philippe Vincent, Givrand (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 646 days.

(21) Appl. No.: 15/101,598

(22) PCT Filed: Dec. 2, 2014

(86) PCT No.: PCT/EP2014/076177
§ 371 (c)(1),
(2) Date: Aug. 10, 2016

(87) PCT Pub. No.: WO2015/082436
PCT Pub. Date: Jun. 11, 2015

(65) Prior Publication Data
US 2016/0355069 A1    Dec. 8, 2016

(30) Foreign Application Priority Data

Dec. 4, 2013   (FR) .................................... 13 62058

(51) Int. Cl.
*F04D 29/46*     (2006.01)
*B60H 1/00*      (2006.01)
(Continued)

(52) U.S. Cl.
CPC ..... *B60H 1/00849* (2013.01); *B60H 1/00028* (2013.01); *B60H 1/00428* (2013.01);
(Continued)

(58) Field of Classification Search
CPC ............ B60H 1/00849; B60H 1/00028; B60H 1/00428; F04D 17/162; F04D 25/06;
(Continued)

(56) References Cited

U.S. PATENT DOCUMENTS 1,365,893 A * 1/1921 Davidson .............. F04D 29/424
417/78
2,073,404 A * 3/1937 Hobbs ................... F04D 17/162
241/191
(Continued)

FOREIGN PATENT DOCUMENTS

DE    102009040545 A1 *  4/2010   .......... F04D 25/163
EP         1980432 A2    10/2008
(Continued)

OTHER PUBLICATIONS

Vincent et al—FR 2788086—Machine Translation (Year: 1998).*
(Continued)

*Primary Examiner* — Justin D Seabe
*Assistant Examiner* — Brian Christopher Delrue
(74) *Attorney, Agent, or Firm* — Osha Liang LLP (57) ABSTRACT

The invention relates to a suction pulser (1) intended for a heating, ventilation and/or air-conditioning device of a motor vehicle, including a turbine (2), separation means (14) capable of defining a first air-flow channel enabling the flow of a first air stream intended to pass through a first axial portion (5) of the turbine (2) and a second air-flow channel enabling the flow of a second air stream intended to pass through a second axial portion (6) of the turbine (2). The separation means comprise a tubular member (14) defining an inner space forming at least one portion of the first air-flow channel, the second air-flow channel extending
(Continued)

outside of the tubular member (14). A filter (35) is mounted upstream from the turbine and the tubular member in a housing (21).

15 Claims, 7 Drawing Sheets

(51) Int. Cl.
    *F04D 17/16*     (2006.01)
    *F04D 29/28*     (2006.01)
    *F04D 29/42*     (2006.01)
    *F04D 25/06*     (2006.01)
    *F04D 29/44*     (2006.01)

(52) U.S. Cl.
    CPC ........... *F04D 17/162* (2013.01); *F04D 25/06* (2013.01); *F04D 29/281* (2013.01); *F04D 29/283* (2013.01); *F04D 29/424* (2013.01); *F04D 29/4206* (2013.01); *F04D 29/441* (2013.01)

(58) Field of Classification Search
    CPC .. F04D 29/281; F04D 29/283; F04D 29/4206; F04D 29/424; F04D 29/441
    USPC .......................................................... 415/185
    See application file for complete search history.

(56) References Cited

U.S. PATENT DOCUMENTS

| | | | | |
|---|---|---|---|---|
| 2,441,411 | A * | 5/1948 | Hagen | F04D 17/162 415/203 |
| 2,727,680 | A * | 12/1955 | Madison | F04D 17/16 415/172.1 |
| 2,798,659 | A * | 7/1957 | Tweedy | F04D 17/16 417/353 |
| 3,598,502 | A * | 8/1971 | Paish | F04D 1/006 415/204 |
| 4,253,798 | A * | 3/1981 | Sugiura | F04D 29/2255 415/204 |
| 4,913,620 | A * | 4/1990 | Kusiak | F04D 9/00 415/169.1 |
| 5,525,036 | A * | 6/1996 | Park | F04D 29/4213 415/208.1 |
| 5,570,996 | A * | 11/1996 | Smiley, III | F04D 29/4226 415/204 |
| 5,967,764 | A * | 10/1999 | Booth | H02K 9/06 416/169 A |
| 6,135,731 | A * | 10/2000 | Woollenweber | F04D 25/06 415/912 |
| 6,428,288 | B1 * | 8/2002 | King | F04D 25/082 415/176 |
| 6,488,475 | B2 * | 12/2002 | Murata | A47L 5/22 417/32 |
| 6,575,695 | B1 * | 6/2003 | Miyamoto | A47L 5/14 415/119 |
| 9,039,360 | B2 * | 5/2015 | Fukuda | F04D 29/162 415/204 |
| 2002/0150478 | A1 * | 10/2002 | Aoki | B60H 1/00457 417/44.1 |
| 2004/0126228 | A1 * | 7/2004 | Roudnev | F04D 7/045 415/196 |
| 2005/0191174 | A1 * | 9/2005 | Zeng | F04D 17/025 415/206 |
| 2006/0034686 | A1 * | 2/2006 | Smiley, III | F04D 29/4213 415/204 |
| 2006/0198729 | A1 * | 9/2006 | Yamasaki | F04D 29/162 415/206 |
| 2006/0285967 | A1 * | 12/2006 | Wang | B60H 1/00471 415/98 |
| 2007/0016328 | A1 * | 1/2007 | Ziegler | A47L 5/14 700/245 |
| 2007/0098556 | A1 * | 5/2007 | Sanagi | F04D 29/282 416/182 |
| 2007/0116559 | A1 * | 5/2007 | Higashida | F04D 29/4213 415/206 |
| 2007/0201976 | A1 * | 8/2007 | Higashida | F04D 29/162 415/206 |
| 2008/0095629 | A1 * | 4/2008 | Eguchi | F04D 29/162 416/179 |
| 2009/0123285 | A1 * | 5/2009 | Sinzaki | F04D 29/281 416/178 |
| 2009/0214334 | A1 * | 8/2009 | Fukami | F04D 29/4213 415/206 |
| 2010/0196174 | A1 * | 8/2010 | Lee | F04D 25/0606 417/410.1 |
| 2010/0322762 | A1 * | 12/2010 | Shirahama | F04D 29/282 415/204 |
| 2010/0322773 | A1 * | 12/2010 | Yoo | A47L 5/22 416/204 R |
| 2011/0002775 | A1 * | 1/2011 | Ma | F04D 29/664 415/119 |
| 2012/0045338 | A1 * | 2/2012 | Tadokoro | F04D 29/281 416/196 R |
| 2012/0057972 | A1 * | 3/2012 | Kim | B60H 1/00507 415/204 |
| 2012/0114512 | A1 * | 5/2012 | Lofy | F04D 29/4226 417/410.1 |
| 2012/0207593 | A1 * | 8/2012 | Ochiai | B60H 1/00471 415/204 |
| 2012/0315135 | A1 * | 12/2012 | Sato | F04D 29/281 415/204 |
| 2013/0051974 | A1 * | 2/2013 | Poon | F04D 29/4206 415/1 |
| 2013/0101451 | A1 * | 4/2013 | Dickinson | F04D 25/0613 417/423.7 |
| 2013/0121818 | A1 * | 5/2013 | Shichiken | F04D 29/162 415/204 |
| 2013/0243585 | A1 * | 9/2013 | Sinzaki | F04D 29/4213 415/204 |
| 2013/0330182 | A1 * | 12/2013 | Kim | F04D 29/162 415/204 |
| 2014/0161602 | A1 * | 6/2014 | Schmidt | F04D 29/4226 415/204 |
| 2014/0255175 | A1 * | 9/2014 | Zheng | F04D 29/444 415/204 |
| 2015/0044077 | A1 * | 2/2015 | Huang | F04D 25/082 417/423.8 |
| 2015/0071773 | A1 * | 3/2015 | Takahashi | F04D 29/4293 415/204 |
| 2015/0086348 | A1 * | 3/2015 | Uehara | F04D 29/4206 415/204 |
| 2015/0157818 | A1 * | 6/2015 | Darby | A61M 16/024 128/201.13 |
| 2015/0159661 | A1 * | 6/2015 | Zahora | F04D 17/105 417/53 |
| 2015/0192147 | A1 * | 7/2015 | An | F04D 29/4213 415/58.4 |
| 2015/0260198 | A1 * | 9/2015 | Aiello | F04D 29/4213 415/206 |
| 2015/0267714 | A1 * | 9/2015 | Irwin | F04D 1/00 415/204 |
| 2015/0337855 | A1 * | 11/2015 | Kim | F04D 29/424 415/203 |
| 2016/0047386 | A1 * | 2/2016 | Uehara | F04D 29/4226 415/204 |
| 2016/0090993 | A1 * | 3/2016 | Uehara | F04D 29/441 415/204 |
| 2016/0153457 | A1 * | 6/2016 | Jang | B60H 1/00471 415/204 |
| 2016/0153458 | A1 * | 6/2016 | Higuchi | F04D 17/162 415/203 |
| 2016/0186771 | A1 * | 6/2016 | Evers | H02K 9/06 416/90 R |

(56) References Cited

U.S. PATENT DOCUMENTS

FOREIGN PATENT DOCUMENTS

| EP | 3273062 A1 * | 1/2018 | ............. F04D 25/06 |
| FR | 2779503 A1 | 12/1999 | |
| FR | 2788086 A1 * | 7/2000 | ......... B60H 1/00849 |
| FR | 2788086 A1 | 7/2000 | |
| FR | 3016795 A1 * | 7/2015 | ........ A61M 16/0066 |
| FR | 3045741 A1 * | 6/2017 | ......... B60H 1/00021 |
| JP | H0924722 A | 1/1997 | |
| WO | WO-2016066739 A1 * | 5/2016 | ........... F04D 25/166 |
| WO | WO-2016133014 A1 * | 8/2016 | ............. F04D 29/44 |
| WO | WO-2016151605 A1 * | 9/2016 | ............. A45D 20/12 |

OTHER PUBLICATIONS

International Search Report issued in corresponding application No. PCT/EP2014/076177 dated Jan. 21, 2015 (4 pages).
Written Opinion of the International Searching Authority issued in corresponding application No. PCT/EP2014/076177 dated Jan. 21, 2015 (5 pages).

* cited by examiner

SUCTION PULSER INTENDED FOR A HEATING, VENTILATION AND/OR AIR-CONDITIONING DEVICE OF A MOTOR VEHICLE

The present invention relates to a suction blower intended for a heating, ventilation and/or air-conditioning device of a motor vehicle.

Patent application FR 2 788 086, in the name of the Applicant, discloses a suction blower comprising a cylindrical turbine capable of being rotated about its axis, with separation means capable of delimiting a first air circulation canal enabling the flow of a first flow of air intended to pass through a first axial part of the turbine and a second air circulation canal enabling the flow of a second flow of air intended to pass through a second axial part of the turbine.

The separation means comprise a tubular member mounted in the region of a first end of said turbine and delimiting an internal space forming part of the first air circulation canal, the second air circulation canal extending outside of the tubular member.

The suction blower additionally comprises air intake means comprising a housing covering the first end of the turbine and the tubular member, said air intake means being capable of directing a first flow of air in the first air circulation canal and of directing a second flow of air in the second air circulation canal.

Such a blower is referred to as "mono-aspiration" because the air enters into the blower from only one side of the turbine, namely from the side where the housing and the tubular separation member are situated.

The abovementioned blower makes it possible to separate two flows of air, namely a flow of recycling air and a flow of air originating from the exterior of the vehicle.

In general, the fact of recycling air, i.e. of taking air from the interior of the vehicle, then conditioning it (that is to say heating it or cooling it) before sending it back to the car interior, makes it possible to improve the comfort of the user. This is because, as the air taken from the car interior is already at a temperature close to the setpoint temperature to be achieved, this makes it possible to arrive rapidly at the temperature desired by the user. However, the recycled air is more laden with humidity than the air originating from the exterior of the vehicle. Also, if recycled air is sent into the car interior close to the windshield (aeration inlets situated in front of the driver or the front passenger, for example) or directly on the windshield, the humidity comprised in the air may condense on the windshield and create fog. A choice may therefore consist in conditioning external air in order to send it into the car interior close to the windshield or directly onto the latter, and in conditioning recycling air in order to send it into the car interior at a distance from the windshield, in the region of the other aeration inlets.

In order to improve the quality of the air sent into the car interior, it is necessary to filter the particles present in the air. The easiest solution to implement consists in placing one or more filters downstream of the suction blower. However, in this case the disassembling and the replacement of the filter are not easy.

There is therefore a requirement to be able to place the filter in a zone which is easily accessible, without, however, significantly increasing the bulk of the heating, ventilation and/or air-conditioning device of a motor vehicle.

In particular, it is an object of the invention to provide a solution to this problem that is simple, effective and economical.

To this end, the invention proposes a suction blower intended for a heating, ventilation and/or air-conditioning device of a motor vehicle, the blower comprising a cylindrical or conical turbine capable of being rotated about the axis of said turbine, with separation means capable of delimiting a first air circulation canal permitting the flow of a first flow of air intended to pass through a first axial part of the turbine and a second air circulation canal permitting the flow of a second flow of air intended to pass through a second axial part of the turbine, said separation means comprising a tubular member mounted in the region of a first end of said turbine and delimiting an internal space forming at least a part of the first air circulation canal, the second air circulation canal extending outside of the tubular member, air intake means comprising a housing covering the first end of the turbine and the tubular member, said air intake means being capable of directing a first flow of air in the first air circulation canal and of directing a second flow of air in the second air circulation canal, characterized in that said housing comprises a filter intended to be passed through by the first and second flows of air.

The fact of placing the filter in the hosing makes it possible to place the filter upstream of the turbine without necessitating a significant increase in the bulk of the suction blower. In addition, the latter is generally placed in an easily accessible place in the vehicle, thereby making it possible for the filter to be disassembled and replaced easily, for example from the glove compartment of the vehicle.

It will be noted that the tubular member is not necessarily cylindrical but may exhibit complex shapes comprising, in particular, at least one rectangular, cylindrical and/or flared zone.

According to one feature of the invention, the housing comprises two lateral zones comprising respectively a first orifice equipped with a first locking means and a second orifice equipped with a second locking means, said locking means being movable between an open position enabling the passage of a flow of air through the corresponding orifice and a closed position prohibiting such a passage of flows of air, the housing additionally comprising a central zone comprising a third and a fourth orifice equipped with at least one valve enabling the opening and/or the closing of said third and fourth orifices to be controlled in such a manner as to permit or prohibit, respectively, the passage of flows of air through said third and fourth orifices, the first orifice and the second orifice being situated facing the filter and the second air circulation canal, which extends outside of the tubular member, the third orifice and the fourth orifice being situated facing the filter and the first air circulation canal, which extends inside the tubular member.

In this way, as a function of the positions of the locking means and of the valve, it is possible to direct the corresponding flows to the first air circulation canal and/or to the second air circulation canal.

Advantageously, the valve of the third and fourth orifices is movable between a first position in which it opens the third orifice and closes the fourth orifice, and a second position in which it closes the third orifice and opens the fourth orifice.

Preferably, the turbine delimits an internal space in which is accommodated a first end of the tubular member, said tubular member comprising an internal and an external surface which flare out in the direction of the first end of the tubular member, the tangents to said internal surface and external surface, in the region of the first end of the tubular member, being directed in a radial plane situated facing the delimitation between the first and second axial parts of the turbine.

In this way, the first and second flows of air are directed, respectively, to the first and second axial parts of the turbine by the tubular member.

In this case, the suction blower may comprise a deflector accommodated in the internal space of the turbine and delimiting, with the flared part of the internal surface of the tubular member, a part of the first air circulation canal.

Advantageously, the radially outer edge of the deflector extends in a substantially radial plane, facing a second end of the turbine.

In addition, the housing may delimit internally an air passage opening comprising a first dimension along a first axial plane and a second dimension along a second axial plane transversal to the first plane, the second end of the tubular member extending over the whole of the first dimension of said opening in the first axial plane and over only part of the second dimension of said opening in the second axial plane.

Thus, the second flow of air may flow between the internal wall of the housing and the external surface of the tubular member, over part of the opening of the housing.

According to another feature of the invention, the housing delimits internally an air passage opening intended to be passed through by the flow or flows of air, the filter extending over the whole of the cross section of said air passage opening.

The invention also relates to a heating, ventilation and/or air-conditioning device of a motor vehicle, comprising at least one external air intake canal and at least one recycling air intake canal, characterized in that it comprises a suction blower of the aforementioned type, characterized in that the first orifice and the third orifice are in communication with the recycling air intake canal, the second orifice and the fourth orifice being in communication with the external air intake canal.

The device may comprise a first outlet canal which is intended to feed at least a first zone of the interior of the vehicle and a second outlet canal which is intended to feed at least a second zone of the interior of the vehicle, the first outlet canal comprising an inlet situated facing the first axial part of the turbine, the second outlet canal comprising an inlet situated facing the second axial part of the turbine.

The two distinct outlet canals may, for example, make it possible to separate a flow of air derived from recycling air and another flow of air derived from the exterior of the vehicle. As indicated previously, the air taken from the exterior of the vehicle is preferably sent back into the interior of the vehicle, after heating or cooling, close to the windshield or directly onto the latter. Conversely, the recycled air is preferably sent back into the interior of the vehicle, after heating or cooling, at a distance from the windshield.

The invention will be better understood and other details, features and advantages of the invention will become apparent upon reading the following description, which is given by way of nonlimiting example, with reference to the appended drawings, in which.

Figure 1:
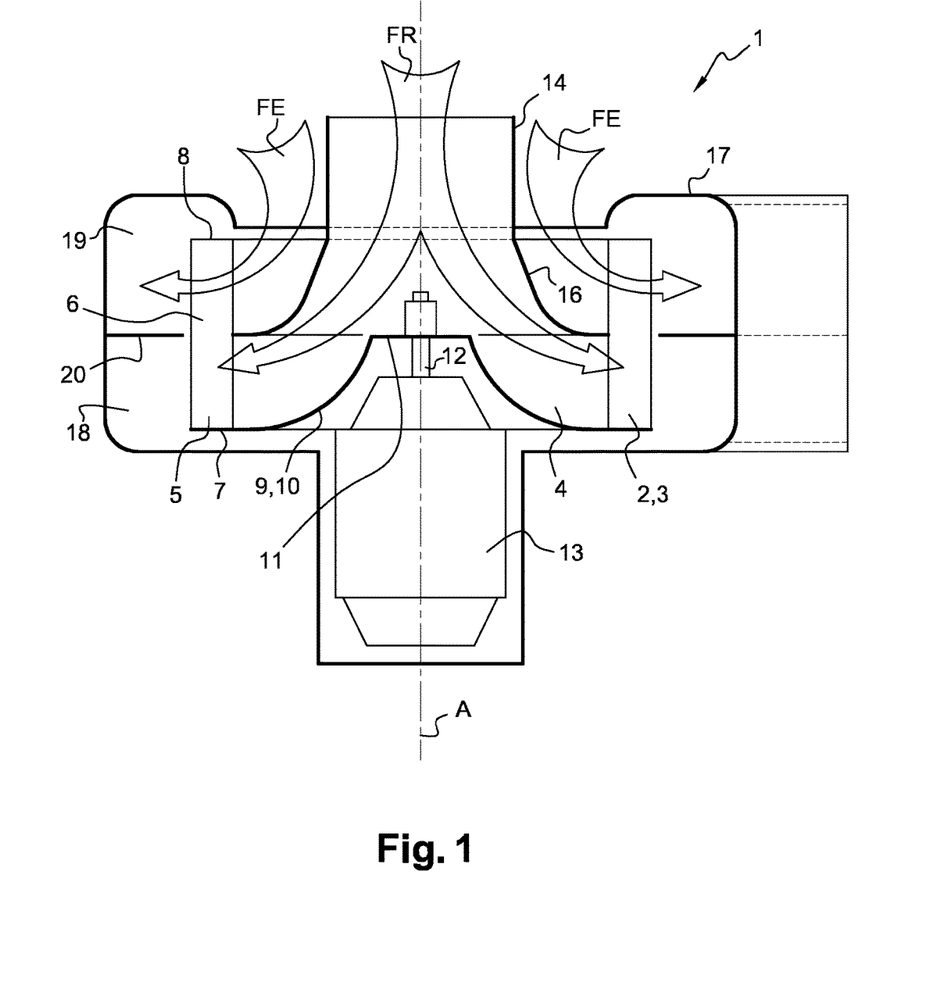
FIG. 1 is a schematic view in axial cross section of a suction blower of the prior art.

FIG. 1 represents a suction blower 1 that is known from patent application FR 2 779 503. This comprises a turbine 2 of generally cylindrical shape, with an axis A. The turbine comprises blades 3 at its radially outer periphery and delimits internally a cylindrical space 4. The turbine 2 comprises a first axial part 5 extending from the end 7 of the turbine 2 as far as an axially central zone, with a second axial part 6 extending from said central zone as far as another end 8 of the turbine 2. A deflector 9 is fixed to the turbine 2. The latter is in the form of a piece with symmetry of revolution about the axis A, the generator of which comprises a rounded radially outer zone 10, the concavity of which is turned upward, that is to say in the direction of the end 8 of the turbine 2, the deflector 9 additionally comprising a central zone 11 in the form of a disk perpendicular to the axis A, in the region of which is fixed a rotary shaft 12 driving an electric motor 13.

The radially outer periphery of the deflector 9 has a tangent which extends in a radial plane and is fixed to the bottom end 7 of the turbine 2.

The terms top and bottom are defined here by reference to the figures and do not have any limiting character.

A tubular member 14 for separation of flows of air is mounted in part in the internal space 4 of the turbine 2, from the top end 8 of the turbine 2.

This tubular member 14 comprises a cylindrical top part 15 and a bottom part 16 which flares out toward the bottom. The bottom part has symmetry of revolution about the axis A, the generator of which is rounded and is turned upward at its concavity. The internal surface (turned downward) of the flared part 16 is substantially parallel to the external surface (turned upward) of the deflector 9.

A housing 17 surrounds the turbine 2 and the motor 13, said housing 17 comprising two canals 18, 19 which extend respectively facing the parts 5, 6 of the turbine 2. The housing 17 comprises in particular an annular separation wall 20 making it possible to delimit the two canals 18, 19. The tubular member 14 is fixed relative to the housing 17.

In operation, the motor 13 causes the deflector 9 and the turbine 2 to rotate.

A first flow of air $F_R$, such as for example air taken from the interior of the car (also called recycling air or recycled air) which has undergone a step of conditioning (heating, air-conditioning) is sent to the interior of the tubular member 14. This flow of air $F_R$ is directed by the corresponding surfaces of the deflector 9 and of the tubular member facing the bottom axial part 5 of the turbine 2. After passing through the blades 3 of the turbine 2, this flow of air $F_R$ enters into the canal 18, with the latter opening into the interior of the vehicle, for example at a distance from the windshield.

A second flow of air $F_E$, such as for example air taken from the exterior of the vehicle which has undergone a step of conditioning (heating, air-conditioning), is sent to the exterior of the tubular member 14. This flow of air $F_E$ is directed by the corresponding surface of the tubular member 14 facing the top axial part 6 of the turbine 2. After passing through the blades 3 of the turbine 2, this flow of air $F_E$ enters into the canal 19, with the latter opening into the interior of the vehicle, for example close to or directly facing the windshield.

One single blower thus enables two distinct flows of air to be generated.

The invention illustrated in FIGS. 2 to 7 is concerned with defining the manner in which the air is brought into the movable member 14 or to the exterior of the latter, and provides for the air to be filtered.

Figure 2:
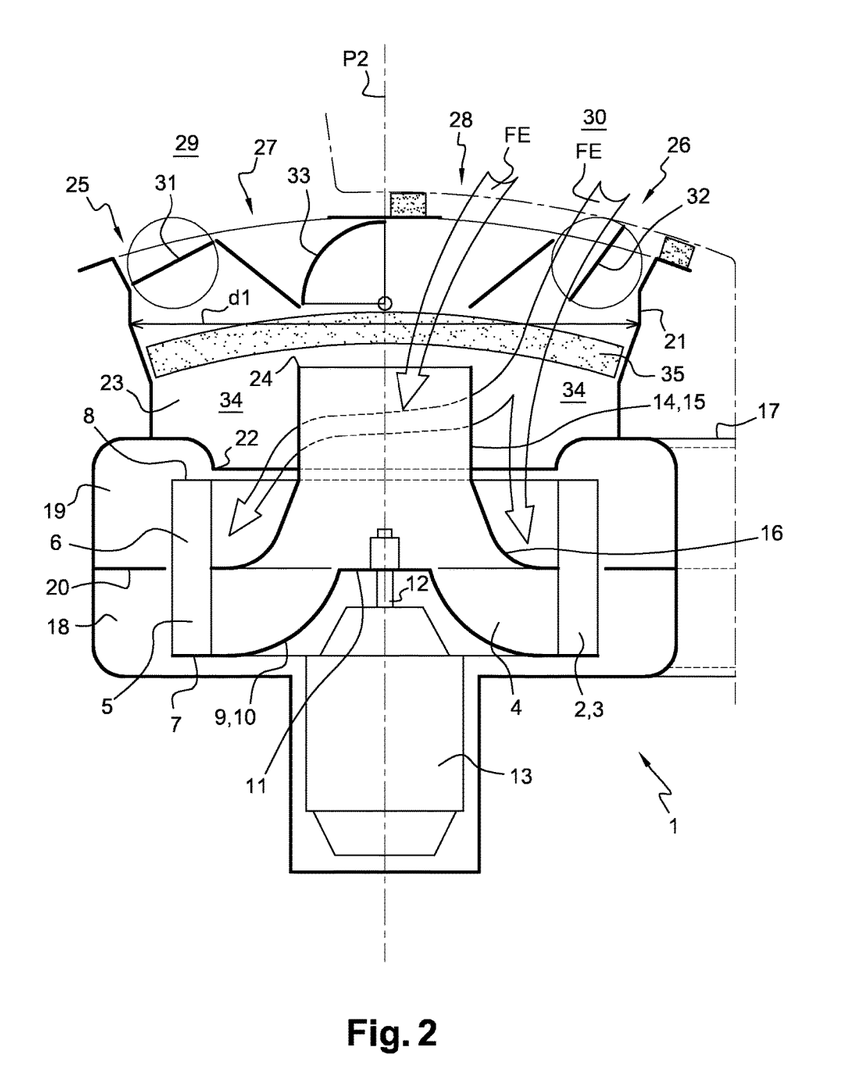
FIG. 2 is a schematic view in axial cross section of a suction blower of the invention, along the plane P1 of FIG. 3, and illustrates a first mode of operation.
Figure 3:
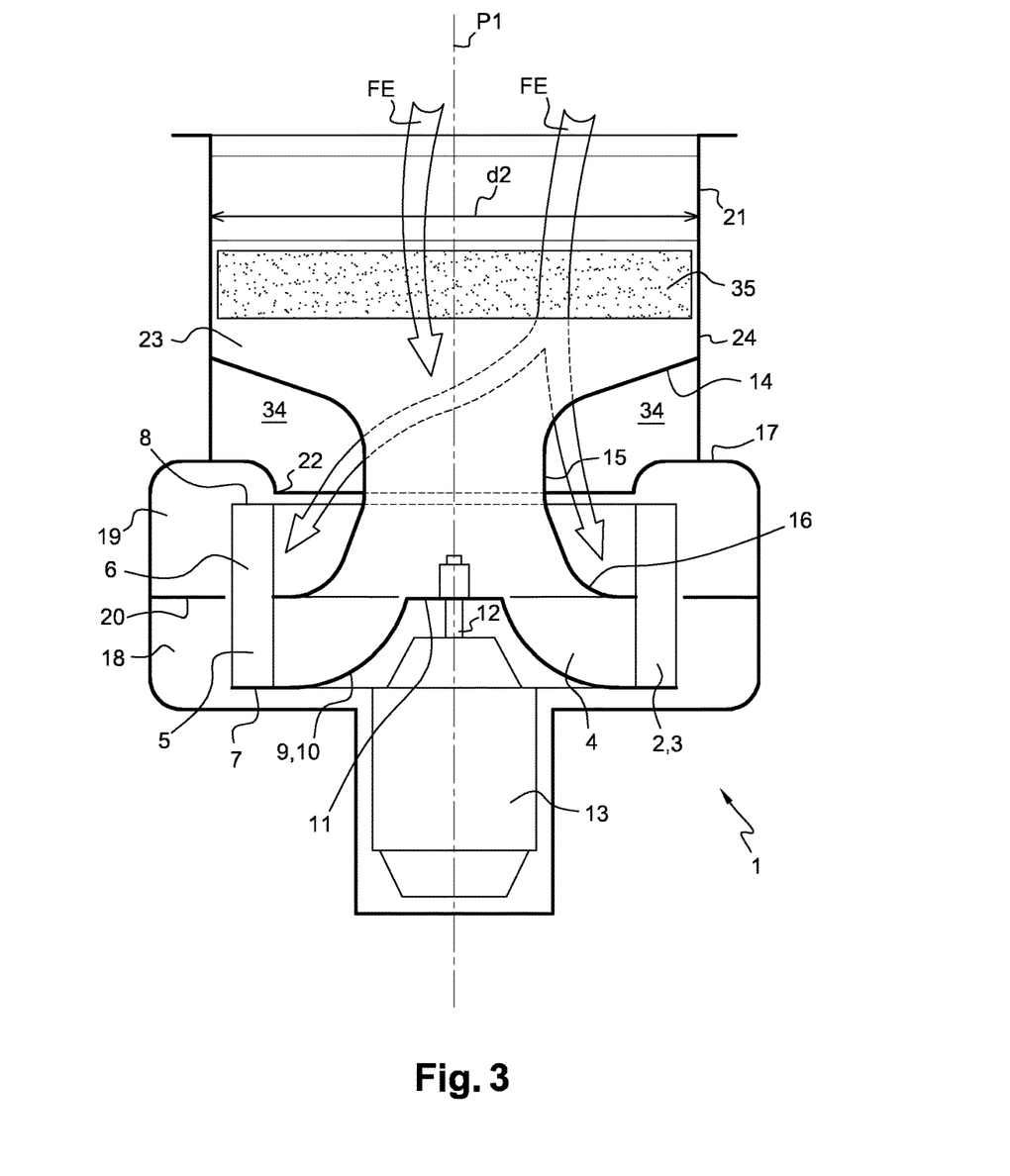
FIG. 3 is a schematic view in axial cross section of the suction blower of FIG. 2, along the plane P2 of FIG. 1, and illustrates the first mode of operation.

FIGS. 2 and 3 illustrate a suction blower 1 in accordance with one embodiment of the invention. This suction blower 1 exhibits substantially the same features as the blower disclosed previously, with the exception of the features detailed below.

In this embodiment of the invention, the suction blower 1 comprises an additional housing 21 fixed above the upper opening 22 of the housing 17. The additional housing 21 delimits an internal space 23 which is open toward the bottom in such a way as to permit the intake of air into the turbine 2 and/or into the tubular member 14.

The internal space 23 of the additional housing 21 thus delimits an air passage opening comprising a first dimension d1 along a first axial plane P1 and a second dimension d2 along a second axial plane 22, the second plane 22 being perpendicular to the first plane P1. In the case where the air passage opening is circular or square, the two dimensions d1, d2 are identical.

The upper end 24 of the tubular member 14, which is of substantially rectangular cross section, extends over the whole of the first dimension d1 in the first axial plane P1 and over only part of the second dimension D2 in the second axial plane P2.

The top part 24 of the tubular member is connected to the cylindrical part 15 by a gradual connection zone, with the cylindrical part 15 itself being extended toward the bottom by the flared part 16.

Thus, in the plane P1, air can flow in the lateral passages 34 situated between the external surface of the tubular member 14 and the internal wall of the housing 23 or the edge of the opening 22 of the housing (FIG. 2).

The upper part of the additional housing 21 comprises four air passage orifices, namely two orifices referenced 25 and 27 situated facing the outlet of a recycling air intake canal 29, as well as two orifices referenced 26 and 28 situated facing the outlet of an air intake canal 30 external to the vehicle.

The orifices 25, 26 are each closed by a locking means, illustrated as a shut-off valve 31, 32, or by a flap that can move between open and closed positions of the corresponding orifice. In addition, a movable valve 33 makes it possible to control the opening or the closing of the orifices 27 and 28. More particularly, the valve 33 can move between a first position, in which it closes the orifice 27 and opens the orifice 28, and a second position, in which it closes the orifice 28 and opens the orifice 27.

The orifices 25 and 26 are situated facing the lateral passages 34 and the orifices 27 and 28 are situated facing the upper opening 24 of the tubular member 14.

A filter 35 is mounted in the additional housing 21 and occupies all of the surface of the air passage opening, given its position in the suction blower 1. Such a filter 35 can be easily disassembled by opening or by removing the additional housing 21 which is accessible, for example, from the glove compartment of the vehicle.

The filter 35 is mounted axially between the orifices 25 to 28 and the upper end 24 of the tubular member 14 situated in the lower part of the additional housing 21.

FIGS. 2 and 3 illustrate a first mode of operation in which the orifices 26 and 28 are open and in which the orifices 25 and 27 are closed. In this case, external air $F_E$ enters via the orifice 28, passes through the filter 35 and the tubular member 14, the bottom part 5 of the turbine 2, and enters into the canal 18. In parallel, external air $F_E$ likewise enters into the canal 18. In parallel, external air $F_E$ likewise enters via the orifice 26, passes through the filter 35, the top part 6 of the turbine 2, and enters into the canal 19.

Such a mode of operation may, for example, be used in the case of heating of the external air $F_E$ (for example in winter or in mid-season).

Figure 4:
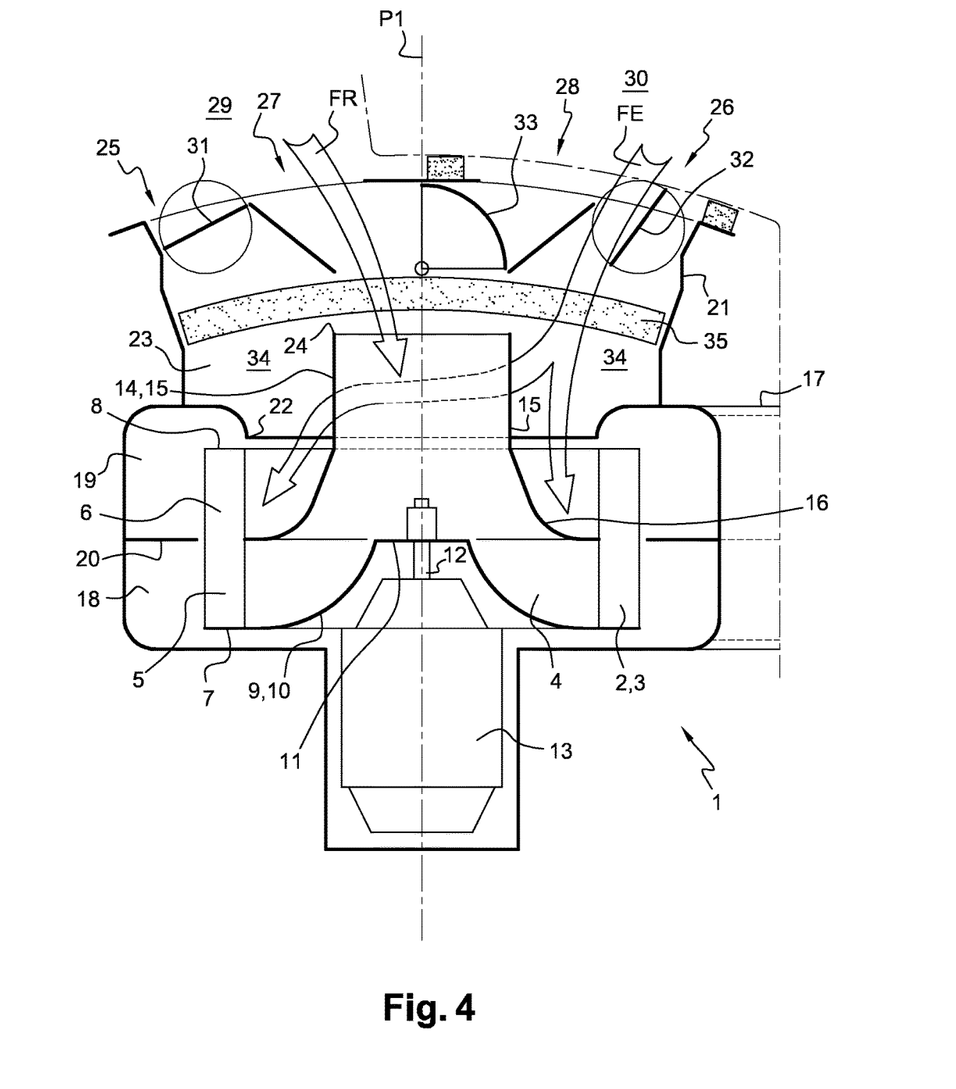
FIGS. 4 and 5 are views corresponding respectively to FIGS. 2 and 3, illustrating a second mode of operation of the invention.
Figure 5:
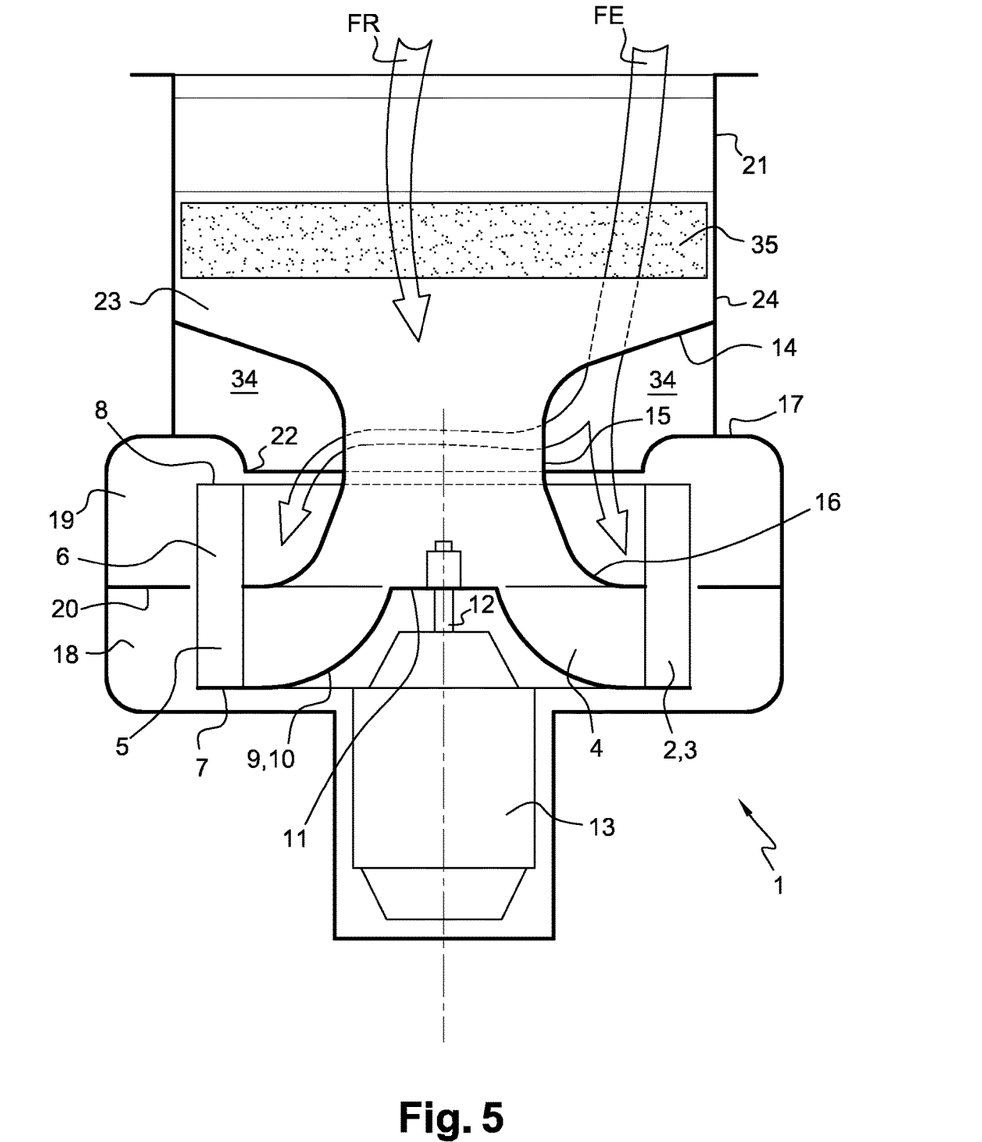

FIGS. 4 and 5 illustrate a second mode of operation in which the orifices 26 and 27 are open and in which the orifices 25 and 28 are closed. In this case, recycling air $F_R$ enters via the orifice 27, passes through the filter 35 and the tubular member 14, the bottom part 5 of the turbine 2, and enters into the canal 18. In parallel, external air $F_E$ enters via the orifice 26, passes through the filter 35, the top part 6 of the turbine 2, and enters into the canal 19.

Such a mode of operation may, for example, be used in the case of heating of the air (for example in winter or in mid-season) and makes it possible to reduce the time necessary for achieving a setpoint temperature, the temperature of the air taken from the car interior being greater than the temperature of the external air.

Figure 6:
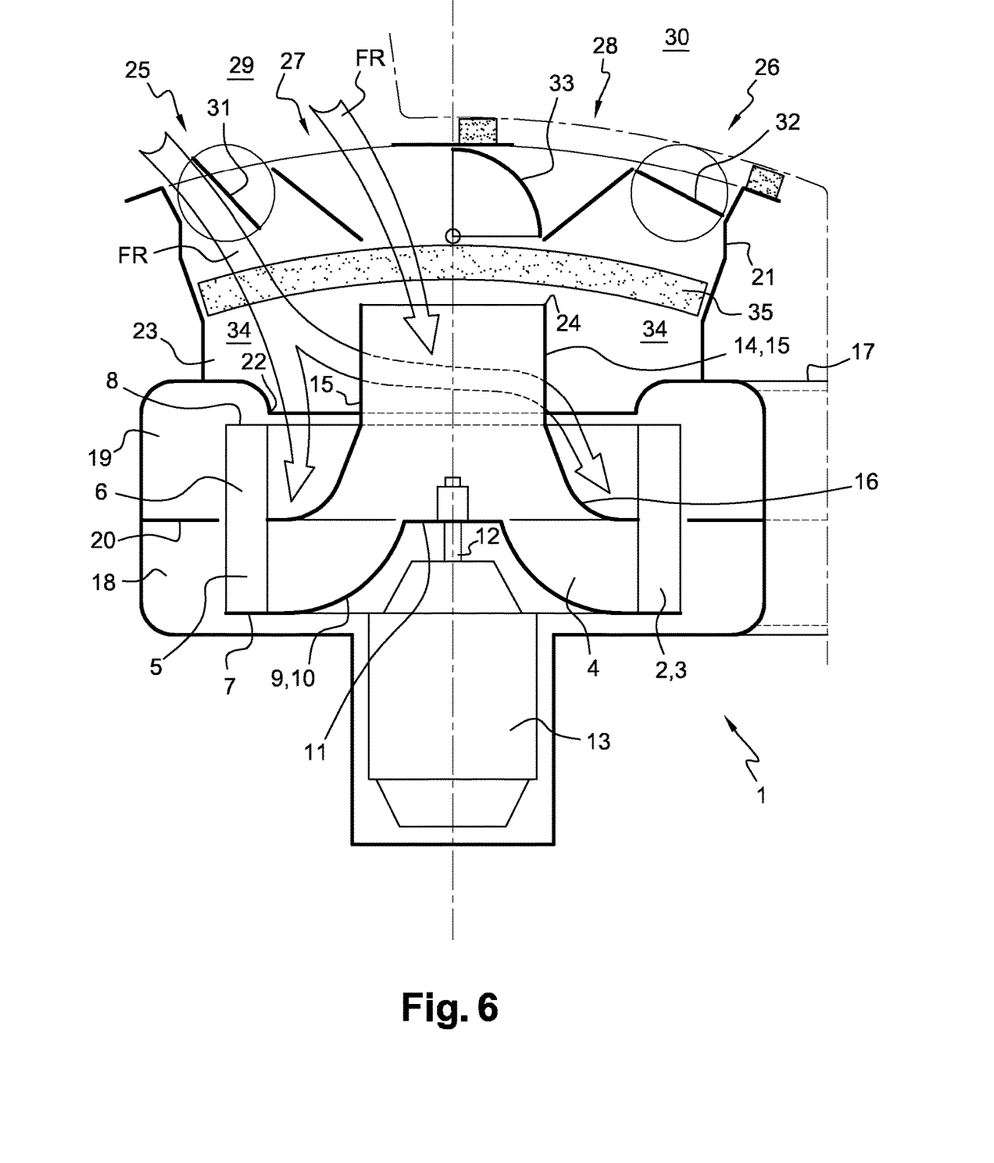
FIGS. 6 and 7 are views corresponding respectively to FIGS. 2 and 3, illustrating a third mode of operation of the invention.
Figure 7:
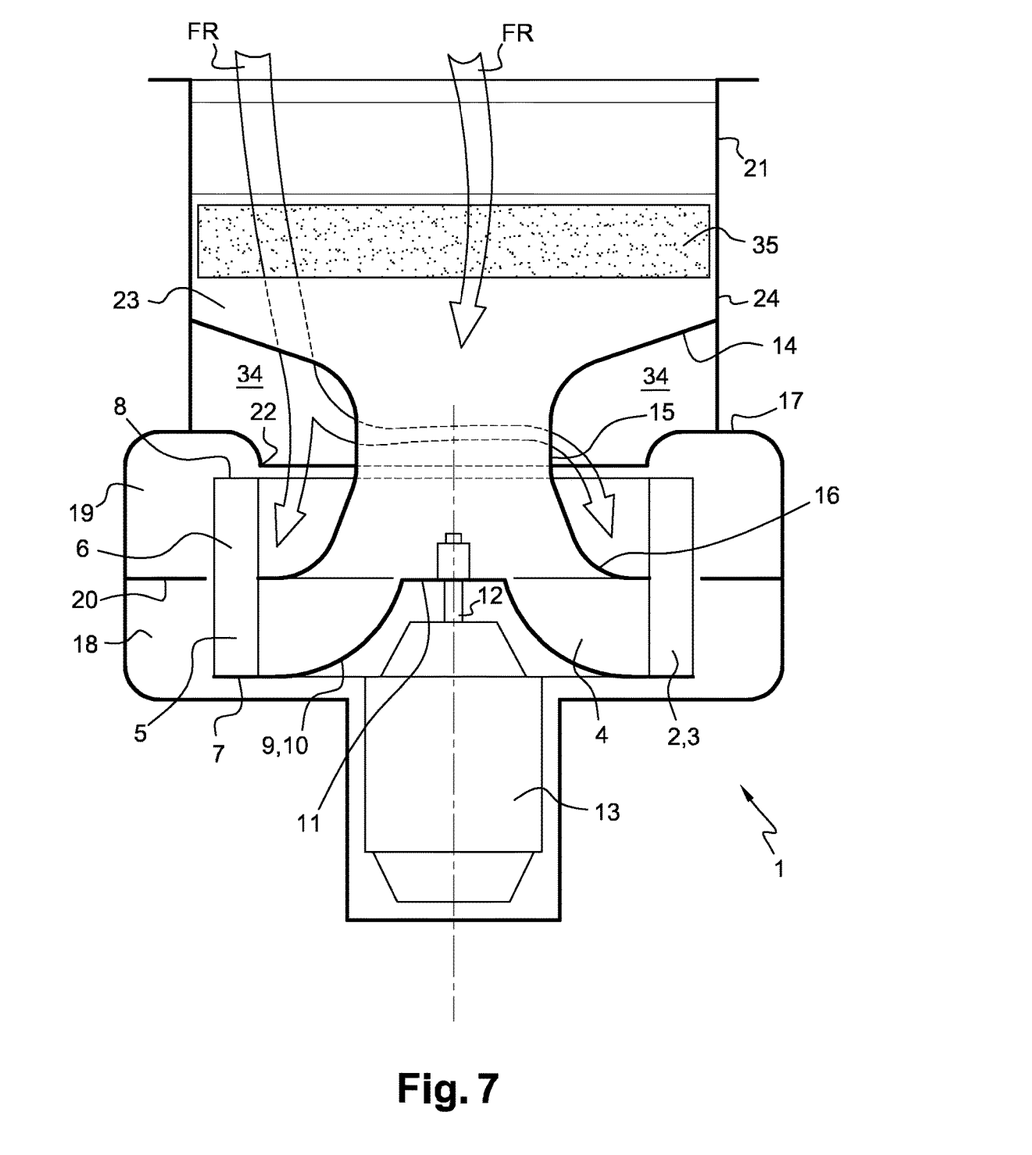

FIGS. 6 and 7 illustrate a third mode of operation in which the orifices 25 and 27 are open and in which the orifices 26 and 28 are closed. In this case, recycling air enters via the orifice 27, passes through the filter 35 and the tubular member 14, the bottom part 5 of the turbine 2, and enters into the canal 18. In parallel, recycling air $F_R$ enters via the orifice 25, passes through the filter 35, the top part 6 of the turbine 2, and enters into the canal 19.

Such a mode of operation may, for example, be used in the case of air-conditioning (for example in summer). Specifically, in such a case, the humidity present in the air in the car interior has a tendency to condense when it passes into the evaporator which enables the air to be cooled. This recycling air is therefore not laden with humidity, or laden with humidity only to a slight extent, and can be sent into the car interior close to the windshield.

The invention claimed is:

1. A suction blower for a heating, ventilation and/or air-conditioning device of a motor vehicle, the blower comprising:
   a cylindrical or conical turbine capable of being rotated about an axis of said turbine; and
   a separation means capable of delimiting a first air circulation canal permitting the flow of a first flow of air intended to pass through a first axial part of the turbine and a second air circulation canal permitting the flow of a second flow of air intended to pass through a second axial part of the turbine, said separation means comprising:
      a tubular member mounted in the region of a first end of said turbine and delimiting an internal space forming at least a part of the first air circulation canal, the second air circulation canal extending outside of the tubular member, and
   air intake means comprising a housing covering the first end of the turbine and the tubular member, said air intake means being capable of directing the first flow of air in the first air circulation canal and of directing the second flow of air in the second air circulation canal,
      wherein said housing comprises:

a filter intended to be passed through by the first and second flows of air;

two lateral zones comprising respectively a first orifice equipped with a first locking means and a second orifice equipped with a second locking means, said first locking means and second locking means being movable between an open position enabling the passage of a flow of air through the corresponding orifice and a closed position prohibiting such a passage of flows of air, and a central zone comprising a third and a fourth orifice equipped with at least one valve enabling the opening and/or the closing of said third and fourth orifices to be controlled in such a manner as to permit or prohibit, respectively, the passage of flows of air through said third and fourth orifices, the first orifice and the second orifice being situated facing the filter and the second air circulation canal, which extends outside of the tubular member, the third orifice and the fourth orifice being situated facing the filter and the first air circulation canal, which extends inside the tubular member.

2. The suction blower as claimed in claim 1, wherein the at least one valve of the third and fourth orifices is movable between a first position in which it opens the third orifice and closes the fourth orifice, and a second position in which it closes the third orifice and opens the fourth orifice.

3. The suction blower as claimed in claim 1, wherein the turbine delimits an internal space that accommodates the first end of the tubular member, said tubular member comprising an internal and an external surface which flare out in the direction of the first end of the tubular member, the tangents to said internal surface and external surface, in the region of the first end of the tubular member, being directed in a radial plane situated facing the delimitation between the first and second axial parts of the turbine.

4. The suction blower as claimed in claim 3, further comprising a deflector, with a flared part, accommodated in the internal space of the turbine and delimiting a part of the first air circulation canal.

5. The suction blower as claimed in claim 4, wherein a radially outer edge of the deflector extends in a substantially radial plane, facing a second end of the turbine.

6. The suction blower as claimed in claim 1, wherein the housing delimits internally an air passage opening comprising a first dimension along a first axial plane and a second dimension along a second axial plane perpendicular to the first plane, the second end of the tubular member extending over only a part of the first dimension of said opening in the first axial plane and over the whole of the second dimension of said opening in the second axial plane.

7. The suction blower as claimed in claim 1, wherein the housing delimits internally an air passage opening intended to be passed through by the flow or flows of air, the filter extending over the whole of the cross section of said air passage opening.

8. A heating, ventilation and/or air-conditioning device of a motor vehicle, comprsing:

at least one external air intake canal;
at least one recycling air intake canal; and
a suction blower comprising:
a cylindrical or conical turbine capable of being rotated about an axis of said turbine; and
a separation means capable of delimiting a first air circulation canal permitting the flow of a first flow of air intended to pass through a first axial part of the turbine and a second air circulation canal permitting the flow of a second flow of air intended to pass through a second axial part of the turbine, said separation means comprising:

a tubular member mounted in the region of a first end of said turbine and delimiting an internal space forming at least a part of the first air circulation canal, the second air circulation canal extending outside of the tubular member, and air intake means comprising a housing covering the first end of the turbine and the tubular member, said air intake means being capable of directing the first flow of air in the first air circulation canal and of directing the second flow of air in the second air circulation canal, wherein said housing comprises:

a filter intended to be passed through by the first and second flows of air;

two lateral zones comprising respectively a first orifice equipped with a first locking means and a second orifice equipped with a second locking means, said first locking means and second locking means being movable between an open position enabling the passage of a flow of air through the corresponding orifice and a closed position prohibiting such a passage of flows of air, and a central zone comprising a third and a fourth orifice equipped with at least one valve enabling the opening and/or the closing of said third and fourth orifices to be controlled in such a manner as to permit or prohibit, respectively, the passage of flows of air through said third and fourth orifices, the first orifice and the second orifice being situated facing the filter and the second air circulation canal, which extends outside of the tubular member, the third orifice and the fourth orifice being situated facing the filter and the first air circulation canal, which extends inside the tubular member, wherein the first orifice and the third orifice are in communication with the recycling air intake canal, the second orifice and the fourth orifice being in communication with the external air intake canal.

9. The device as claimed in claim 8, further comprising a first outlet canal which is intended to feed at least a first zone of the interior of the vehicle and a second outlet canal which is intended to feed at least a second zone of the interior of the vehicle, the first outlet canal comprising an inlet situated facing the first axial part of the turbine, the second outlet canal comprising an inlet situated facing the second axial part of the turbine.

10. A suction blower for a heating, ventilation and/or air-conditioning device of a motor vehicle, the blower comprising:

a cylindrical or conical turbine capable of being rotated about an axis of said turbine; and a separation means capable of delimiting a first air circulation canal permitting the flow of a first flow of air intended to pass through a first axial part of the turbine and a second air circulation canal permitting the flow of a second flow of air intended to pass through a second axial part of the turbine, said separation means comprising:

a tubular member mounted in the region of a first end of said turbine and delimiting an internal space forming at least a part of the first air circulation canal, the second air circulation canal extending outside of the tubular member, and air intake means comprising a housing covering the first end of the turbine and the tubular member, said air intake means being capable of directing the first flow of air in the first air circulation canal and of directing the second flow of air in the second air circulation canal, wherein said housing comprises:

a filter intended to be passed through by the first and second flows of air;

two lateral zones comprising respectively a first orifice equipped with a first locking means and a second orifice equipped with a second locking means, said first locking means and second locking means being movable between an open position enabling the passage of a flow of air through the corresponding orifice and a closed position prohibiting such a passage of flows of air, and a central zone comprising a third and a fourth orifice equipped with at least one valve enabling the opening and/or the closing of said third and fourth orifices to be controlled in such a manner as to permit or prohibit, respectively, the passage of flows of air through said third and fourth orifices, the first orifice and the second orifice being situated facing the filter and the second air circulation canal, which extends outside of the tubular member, the third orifice and the fourth orifice being situated facing the filter and the first air circulation canal, which extends inside the tubular member, wherein the at least one valve of the third and fourth orifices is movable between a first position in which it opens the third orifice and closes the fourth orifice, and a second position in which it closes the third orifice and opens the fourth orifice.

11. The suction blower as claimed in claim 10, wherein the turbine delimits an internal space that accommodates the first end of the tubular member, said tubular member comprising an internal and an external surface which flare out in the direction of the first end of the tubular member, the tangents to said internal surface and external surface, in the region of the first end of the tubular member, being directed in a radial plane situated facing the delimitation between the first and second axial parts of the turbine.

12. The suction blower as claimed in claim 11, further comprising a deflector, with a flared part, accommodated in the internal space of the turbine and delimiting a part of the first air circulation canal.

13. The suction blower as claimed in claim 12, wherein a radially outer edge of the deflector extends in a substantially radial plane, facing a second end of the turbine.

14. The suction blower as claimed in claim 10, wherein the housing delimits internally an air passage opening comprising a first dimension along a first axial plane and a second dimension along a second axial plane perpendicular to the first plane, the second end of the tubular member extending over only a part of the first dimension of said opening in the first axial plane and over the whole of the second dimension of said opening in the second axial plane.

15. The suction blower as claimed in claim 10, wherein the housing delimits internally an air passage opening intended to be passed through by the flow or flows of air, the filter extending over the whole of the cross section of said air passage opening.

* * * * *